United States Patent
Harris (10) Patent No.: US 12,099,901 B2
(45) Date of Patent: Sep. 24, 2024

(54) SYSTEMS AND METHODS FOR TUNING CAPACITANCE IN QUANTUM DEVICES

(71) Applicant: D-WAVE SYSTEMS INC., Burnaby (CA)

(72) Inventor: Richard G. Harris, Vancouver (CA)

(73) Assignee: D-WAVE SYSTEMS INC., Burnaby (CA)

(*) Notice: Subject to any disclaimer, the term of this patent is extended or adjusted under 35 U.S.C. 154(b) by 0 days.

(21) Appl. No.: 18/243,280

(22) Filed: Sep. 7, 2023

(65) Prior Publication Data

US 2024/0070497 A1     Feb. 29, 2024

Related U.S. Application Data (63) Continuation of application No. 16/996,355, filed on Aug. 18, 2020, now Pat. No. 11,790,259.

(60) Provisional application No. 62/896,996, filed on Sep. 6, 2019.

(51) Int. Cl.
*G06N 10/00* (2022.01)
*G06F 15/78* (2006.01)
*G06N 10/40* (2022.01)

(52) U.S. Cl.
CPC ......... *G06N 10/00* (2019.01); *G06F 15/7867* (2013.01); *G06N 10/40* (2022.01)

(58) Field of Classification Search
CPC ..... G06N 10/00; G06N 10/40; G06F 15/7867
See application file for complete search history.

(56) References Cited

U.S. PATENT DOCUMENTS

| | | |
|---|---|---|
| 3,573,759 A | 4/1971 | Zimmerman et al. |
| 4,028,714 A | 6/1977 | Henkels |
| 4,504,926 A | 3/1985 | Toyoda |
| 4,769,753 A | 9/1988 | Knudson et al. |
| 4,956,642 A | 9/1990 | Harada |
| 5,162,731 A | 11/1992 | Fujimaki |
| 5,323,344 A | 6/1994 | Katayama et al. |
| 5,326,986 A | 7/1994 | Miller et al. |
| 5,329,165 A | 7/1994 | Kao et al. |
| 5,768,297 A | 6/1998 | Shor |
| 5,787,307 A | 7/1998 | Imoto |

(Continued)

FOREIGN PATENT DOCUMENTS

| | | |
|---|---|---|
| DE | 19511172 A1 | 10/1996 |
| EP | 0251568 A1 | 1/1988 |

(Continued)

OTHER PUBLICATIONS

Orlando et al., "Superconducting persistent-current qubit," Physical Review B 60(22):15398-15413, Dec. 1, 1999.

(Continued)

*Primary Examiner* — Matthew L Reames
(74) *Attorney, Agent, or Firm* — Cozen O'Connor (57) ABSTRACT

Quantum processors having qubits with tunable capacitance are provided. The qubits include Josephson junctions shunted by capacitors and are tunably coupled to capacitance loops such that the resonant frequencies of the qubits and capacitance loops avoid entanglement with each other. Methods for tuning the capacitance of such qubits by varying the coupler's coupling strength are provided. These methods include methods for calibrating qubits' capacitance.

18 Claims, 5 Drawing Sheets

(56) References Cited

U.S. PATENT DOCUMENTS

| | | | |
|---|---|---|---|
| 5,869,846 A | 2/1999 | Higashino et al. |
| 5,917,322 A | 6/1999 | Gershenfeld et al. |
| 6,128,764 A | 10/2000 | Gottesman |
| 6,157,044 A | 12/2000 | Nakanishi et al. |
| 6,169,981 B1 | 1/2001 | Werbos |
| 6,317,766 B1 | 11/2001 | Grover |
| 6,360,112 B1 | 3/2002 | Mizuno et al. |
| 6,459,097 B1 | 10/2002 | Zagoskin |
| 6,495,854 B1 | 12/2002 | Newns et al. |
| 6,504,172 B2 | 1/2003 | Zagoskin et al. |
| 6,563,310 B2 | 5/2003 | Zagoskin |
| 6,563,311 B2 | 5/2003 | Zagoskin |
| 6,605,822 B1 | 8/2003 | Blais et al. |
| 6,614,047 B2 | 9/2003 | Tzalenchuk et al. |
| 6,627,915 B1 | 9/2003 | Ustinov et al. |
| 6,633,053 B1 | 10/2003 | Jaeger |
| 6,649,929 B2 | 11/2003 | Newns et al. |
| 6,670,630 B2 | 12/2003 | Blais et al. |
| 6,728,131 B2 | 4/2004 | Ustinov |
| 6,753,546 B2 | 6/2004 | Tzalenchuk et al. |
| 6,803,599 B2 | 10/2004 | Amin et al. |
| 6,838,694 B2 | 1/2005 | Esteve et al. |
| 6,885,325 B2 | 4/2005 | Omelyanchouk et al. |
| 6,897,468 B2 | 5/2005 | Blais et al. |
| 6,900,454 B2 | 5/2005 | Blais et al. |
| 6,900,456 B2 | 5/2005 | Blais et al. |
| 6,911,664 B2 | 6/2005 | Il et al. |
| 6,919,579 B2 | 7/2005 | Amin et al. |
| 6,930,320 B2 | 8/2005 | Blais et al. |
| 6,943,368 B2 | 9/2005 | Amin et al. |
| 6,960,780 B2 | 11/2005 | Blais et al. |
| 6,979,836 B2 | 12/2005 | Zagoskin et al. |
| 7,002,174 B2 | 2/2006 | Il et al. |
| 7,015,499 B1 | 3/2006 | Zagoskin |
| 7,135,701 B2 | 11/2006 | Amin et al. |
| 7,230,266 B2 | 6/2007 | Hilton et al. |
| 7,253,654 B2 | 8/2007 | Amin |
| 7,307,275 B2 | 12/2007 | Lidar et al. |
| 7,418,283 B2 | 8/2008 | Amin |
| 7,533,068 B2 | 5/2009 | Maassen et al. |
| 7,605,600 B2 | 10/2009 | Harris |
| 7,613,764 B1 | 11/2009 | Hilton et al. |
| 7,619,437 B2 | 11/2009 | Thom et al. |
| 7,624,088 B2 | 11/2009 | Johnson et al. |
| 7,843,209 B2 | 11/2010 | Berkley |
| 7,876,248 B2 | 1/2011 | Berkley et al. |
| 8,008,942 B2 | 8/2011 | Van et al. |
| 8,018,244 B2 | 9/2011 | Berkley |
| 8,035,540 B2 | 10/2011 | Berkley et al. |
| 8,098,179 B2 | 1/2012 | Bunyk et al. |
| 8,102,185 B2 | 1/2012 | Johansson et al. |
| 8,169,231 B2 | 5/2012 | Berkley |
| 8,190,548 B2 | 5/2012 | Choi |
| 8,195,596 B2 | 6/2012 | Rose et al. |
| 8,421,053 B2 | 4/2013 | Bunyk et al. |
| 8,536,566 B2 | 9/2013 | Johansson et al. |
| 8,611,974 B2 | 12/2013 | Maibaum et al. |
| 8,644,898 B1 | 2/2014 | De Andrade et al. |
| 8,854,074 B2 | 10/2014 | Berkley |
| 8,951,808 B2 | 2/2015 | Ladizinsky et al. |
| 9,152,923 B2 | 10/2015 | Harris et al. |
| 9,495,644 B2 | 11/2016 | Chudak et al. |
| 9,710,758 B2 | 7/2017 | Bunyk et al. |
| 9,870,277 B2 | 1/2018 | Berkley |
| 10,037,493 B2 | 7/2018 | Harris et al. |
| 10,068,180 B2 | 9/2018 | Amin et al. |
| 10,312,141 B2 | 6/2019 | Kirby et al. |
| 10,528,886 B2 | 1/2020 | Boothby |
| 11,127,893 B2 | 9/2021 | Johnson et al. |
| 11,424,521 B2 | 8/2022 | Whittaker et al. |
| 11,494,683 B2 | 11/2022 | Amin et al. |
| 2001/0020701 A1 | 9/2001 | Zagoskin |
| 2001/0023943 A1 | 9/2001 | Zagoskin |
| 2002/0179937 A1 | 12/2002 | Ivanov et al. |
| 2002/0180006 A1 | 12/2002 | Franz et al. |
| 2003/0111661 A1 | 6/2003 | Tzalenchuk et al. |
| 2003/0193097 A1 | 10/2003 | Il et al. |
| 2004/0016918 A1 | 1/2004 | Amin et al. |
| 2004/0071019 A1 | 4/2004 | Magnus et al. |
| 2008/0215850 A1 | 9/2008 | Berkley et al. |
| 2011/0060780 A1 | 3/2011 | Berkley et al. |
| 2012/0094838 A1 | 4/2012 | Bunyk et al. |
| 2012/0124432 A1 | 5/2012 | Pesetski et al. |
| 2014/0229722 A1 | 8/2014 | Harris |
| 2015/0032991 A1 | 1/2015 | Lanting et al. |
| 2015/0111754 A1* | 4/2015 | Harris ............... H03K 3/38 365/162 |
| 2015/0219730 A1 | 8/2015 | Tsukamoto et al. |
| 2015/0263736 A1 | 9/2015 | Herr et al. |
| 2016/0132785 A1 | 5/2016 | Amin et al. |
| 2017/0256698 A1 | 9/2017 | Nayfeh et al. |
| 2018/0054201 A1 | 2/2018 | Reagor et al. |
| 2018/0247217 A1 | 8/2018 | Heeres et al. |
| 2018/0314970 A1 | 11/2018 | Harris et al. |
| 2018/0341874 A1 | 11/2018 | Puri et al. |
| 2019/0164959 A1 | 5/2019 | Thomas et al. |
| 2019/0392878 A1 | 12/2019 | Murduck et al. |
| 2020/0036332 A1 | 1/2020 | Abdo |
| 2020/0090738 A1 | 3/2020 | Naaman et al. |
| 2020/0320426 A1 | 10/2020 | Amin et al. |
| 2020/0401649 A1 | 12/2020 | Lanting |
| 2021/0073667 A1 | 3/2021 | Harris |
| 2022/0020913 A1 | 1/2022 | Harris et al. |
| 2023/0027682 A1 | 1/2023 | Molavi et al. |

FOREIGN PATENT DOCUMENTS

| | | |
|---|---|---|
| EP | 0916961 A2 | 5/1999 |
| EP | 1085422 A2 | 3/2001 |
| KR | 20190015330 A | 2/2019 |
| WO | 9612305 A1 | 4/1996 |
| WO | 03090161 A2 | 10/2003 |
| WO | 03090161 A3 | 2/2005 |
| WO | 2015013532 A1 | 1/2015 |
| WO | 2017192733 A2 | 11/2017 |
| WO | 2021126875 A1 | 6/2021 |
| WO | 2022155140 A1 | 7/2022 |
| WO | 2023004040 A1 | 1/2023 |
| WO | 2023219656 A2 | 11/2023 |

OTHER PUBLICATIONS

Ortlepp et al., "Access Time and Power Dissipation of a Model 256-Bit Single Flux Quantum RAM", IEEE Transactions on Applied Superconductivity, vol. 24, No. 4, Aug. 2014.

Ortlepp et al., "Design Guidelines for Suzuki Stacks as Reliable High-speed Josephson Voltage Drivers", Superconductor Science Technology, 26 (2013) 035007 (12pp).

Plastina et al. "Communicating Josephson qubits", arXiv.org:cond-mat/0206586 (2002).

Poyatos et al., "Schemes of Quantum Computations With Trapped Ions", Fortschritte der Physik 48, pp. 785-799, 2000.

Puri, et al., "Quantum Annealing with All-to-all Connected Nonlinear Oscillators", Nature Communications, vol. 8, Article No. 15785, Jun. 8, 2017, 9 pages.

Raussendorf, et al., "Fault-Tolerant quantum computation with high threshold in two dimensions", arXiv:quant-ph/0610082v2, May 14, 2007, 4 pages.

Rey-de-Castro et al., "Design of an RSFQ Control Circuit to Observe MQC on an rf-SQUID", IEEE Transactions on Applied Superconductivity 11, pp. 1014-1017 (2001).

Rifkin et al., "Current-Phase relation and phase-dependent conductance of superconducting point contacts from rf impedance measurements", Phys. Rev. B ]313894-3901 (1976).

Rifkin et al., "rf SQUID's in the nonhysteretic mode: Detailed comparison of theory and experiment," J. App. Phys 47, pp. 2645-2650, 1976.

Schmidt et al., "Experimental investigations of the stationary behaviour of thin film double SQUIDS", Physica B&C Netherlands vol. 125B+C No. 2, Aug. 1984, pp. 185-198, Aug. 1, 1984.

(56) References Cited

OTHER PUBLICATIONS

Schmidt, "The Physics of Superconductors", P. Muller and AV. Ustinov (Eds.), Springer, 1997, chapter 4.
Schoelkopf et al., "The Radio-Frequency Single-Electron Transistor (RF-SET): A Fast and Ultrasensitive Electrometer", Science 280, pp. 1238-1242 (1998).
Sete, et al., "Purcell Effect with Microwave Drive: Suppression of Qubit Relaxation Rate", arXiv: 1401.5545v2, Mar. 21, 2014, 15 pages.
Shi, et al., "Multiplexed control scheme for scalable quantum information processing with superconducting qubits", arXiv:2312.06911v1 [quant-ph] Dec. 12, 2023, 8 pages.
Shnirman et al., "Quantum measurements performed With a single-electron transistor", Phys. Rev. B 57(24) 115400-15407 (1998).
Shor, "Polynominal-Time Algorithms for Prime Factorization and Discrete Logarithms on a Quantum Computer", SIAM Journal on Computing 26, pp. 1484-1509 (1997).
Silver et al., "Quantum States and Transitions in Weakly Connected Superconducting Rings", Phys. Rev 157, pp. 317-341, 1967.
Simbierowicz, et al., "Flux-driven Josephson Parametric Amplifier for Sub-GHz Frequencies Fabricated with Side-wall Passivated Spacer Junction Technology", arXiv:1805.07307v1, May 18, 2018, 15 pages.
Spiller, "Superconducting Circuits for Quantum Computing," Fortschritte der Physik 48, pp. 1075-1094, 2000.
Stolz et al., "LTS SQUID sensor with a new configuration," Supercon. Sci. Tech. 12, pp. 806-808, 1999.
Tanaka et al., "DC SQUID Readout Readout for Qubit," Physica C, 3681300 304 (Mar. 2002).
Tang, et al., "Robust surface code topology against sparse fabrication defects in a superconducting-qubit array", Phys. Rev. A 93. 032322—Published Mar. 15, 2018, 4 pages.
Tokunaga et al., "SiO2 passivation film effects on YBCO junctions", Science Direct, Sep. 10, 1998.
Tsuei et al., "Pairing symmetry in flux quantization in a tricrystal superconducting ring Yba2Cu3O7-delta", Physical Review Letters, 73, pp. 593-596, 1994.
Tzalenchuk et al., "SQUID and Hall-probe microscopy of superconducting films", IOP conference series 167, pp. 581-584, 2000.
Van der Wal et al., "Quantum Superposition of Macroscopic Persistent current states", Science 290, pp. 773-777, 2000.
Vandersypen et al., "Experimental realiZation of order-finding With a quantum computer", ArXiv.org:quant-ph/0007017, pp. 1-4 (2000).
Venegas-Andraca, et al., "A cross-disciplinary introduction to quantum annealing-base algorithms", Contemporary Physics, Quantum Annealing ArXiv:1803.03372v1 [puant-ph] Mar. 9, 2018, 31 pages.
Vion et al., "Manipulating the quantum state of an electrical circuit", Science, 296, pp. 886-889 (2002).
Walraff et al., "Annular Long Josephson Junctions in a Magnetic Field: Engineering and Probing the Fluxon Interaction Potential", arXivcond-mat/9911437v1 [cond-mat.supr-com] Nov. 26, 1999, 11 pages.
Watanabe, M. et al., "Resonance-Free Low-Pass Filters for the AC Josephson Voltage Standard," IEEE Transactions on Applied Superconductivity, 16(1), Mar. 2006, 5 pages.
Wendin et al., "Superconducting Quantum Circuits, Qubits and Computing," arXiv:cond-mat/0508729v1 [cond-mat.supr-con], Aug. 30, 2005, 60 pages.
White et al., "Traveling wave parametric amplifier with Josephson junctions using minimal resonator phase matching", Applied Physics Letters 106, Jun. 15, 2015.
Xi et al., "Effects of Fields induced hole density modulation on normal state and superconducting transport in YBa2Cu3O7-x", Physical Review Letters, 68, pp. 1240-1243, 1992.
Yamamoto, "Flux Driven Josephson Parametric Amplifier", arXiv:0808.1386v1 [cond-mat.supr-con] 2008.
Yan et al., "A tunable coupling scheme for implementing high-fidelity two-qubit gates", Arxiv:1803.09813v1, Mar. 26, 2018.
Yu et al., "Coherent temporal oscillations of macroscopic quantum states in a Josephson junction", Science, 296, pp. 889-892, 2002.
Zagoskin et al., "Superconducting Qubits," arXiv:0805.0164v1, May 1, 2008.
Zagoskin, "A scalable, tunable qubit, based on a clean DND or grain boundary D_D junction", Los Alamos National Laboratory preprint cond-mat/9903170, pp. 1-8, 1999.
Zahn, "Experimental Apparatus for the measurement if the quantum interferences of the critical current of DC-tunnel SQUIDs", Experimentelle technik der physik East Germany vol. 28, No. 2, 1980, pp. 163-168, 1980.
Zahn, "The critical current of the low damped DC-Squid", Experimentelle technik der physik East Germany vol. 31, No. 4, 1983, pp. 311-318, 1983.
Zhang et al., "Non-constant bias current for dc SQUID operation", Physica C 368, pp. 181-184, 2002.
Zhang et al., "Operation of high-temperature rf SQUID magnetometers using dielectric SrTiO3 resonators", App. Phys. Lett. 67, pp. 3183-3185, 1995.
Zhang et al., "Substrate resonator for HTS rf SQUID operation", Physica C 372-3761282-286 (2002).
Zhao, et al. "Two-photon Driven Kerr Resonator for Quantum Annealing with Three-dimensional Circuit QED", arXiv:1712.03613v2, Dec. 12, 2017, 13 pages.
Zhou et al, "Experimental Realization of Spin Liquids in a Programmable Quantum Device", arXiv:2009.07853v2, 2020.
Zorin, "Quantum-Limited Electrometer Based on Single Cooper Pair Tunneling", Phys. Rev. Lett. 76, pp. 4408-4411, 1996.
Zorin, "Radio-Frequency Bloch-Transistor Electrometer", Phys. Rev. Lett. 86, pp. 3388-3391, 2001.
Zurek, "Decoherence and the transition from quantum to classical", Physics Today, 44, 10, pp. 36-44, 1991.
"Quantum Dreams", Economist,pp. 1-3 (Mar. 8, 2001).
Aassime et al., "Radio-frequency Single-electron Transistor as Readout Device for Qubits: charge sensitivity and backaction", Phys Rev Lett 86, pp. 3376-3379, 2001.
Abrams et al., "A quantum algorithm providing exponential speed increase for finding eigenvalues and eigenvectors," arXiv:quant-ph/9807070v1, Jul. 24, 1998, 9 pages.
Abrams et al., "Simulation of Many-Body Fermi Systems on a Universal Quantum Computer," arXiv:quant-ph/9703054, Mar. 28, 1997, 10 pages.
Al-Saidi et al., "Eigenstates of a small Josephson junction coupled to a resonant cavity", Physical Review B, 65, pp. 014512-1 to 014512-7, 2001.
Anlage et al., "Superconducting Material Diagnostics using a scanning Near-field Microwave Microscope", Los Alamos National Laboratory pre-print cond-met/9811158, pp. 1-6, 1998.
Armour et al., "Entangle ment and Decoherence of a Micromechanical Resonator via Coupling to a Cooper-Pair Box", Physical Review Letters, 88, pp. 148304-1 to 148301-4, 2002.
Ataides, et al., "the XZZX surface code", Nature Communications, https://doi.org/10.1038/s41467-021-22274-1,. 2021, 12 pages.
Augar et al., "Fault-tolerance thresholds for the surface code with fabrication errors", Phys. Rev. A 96 042316—Published Oct. 12, 2017, 4 pages.
Averin et al., "Quantum Computing and Quantum Measurements With Mesoscopic Josephson Junctions", Fortschritte der Physik 48, pp. 1055-1074, 2000.
Averin et al., "Variable Electrostatic Transformer: Controllable Coupling of Two Charge Qubits," Physical Review Letters 91(5): 057003-1-057003-4, Aug. 1, 2003. arXiv:cond-mat/0304166v1, Apr. 7, 2003.
Averin, D.V., "Adiabatic Quantum Computation with Cooper Pairs," arXiv:quant-ph/9706026v1, Jun. 13, 1997, 18 pages.
Barenco et al., "Elementary gates for quantum computation," Physical Review A 52(5):3457-3467, Nov. 1995.
Barone et al., "Quantum Computation With Aharonov-Bohm Qubits", WWW.arXiv.org preprint: cond-mat/0203038 v1 (Mar. 2, 2002).
Barrett, et al., "Fault Tolerant Quantum Computation with Very High Threshold for Loss Errors", Phys. Rev. Lett. 105, 200502—Published Nov. 9, 2010, 4 pages.
Baust,, Characterization of Flux-driven Josephson Parametric Amplifiers, Diploma Thesis, Technische Universitat Munchen, Aug. 2010, 119 pages.

(56) References Cited

OTHER PUBLICATIONS

Beasley et al., "Time-reversal Symmetry breaking in superconductors: A proposed Experimental test", Physical Review B, 49, pp. 12330-12332, 1994.
Bell et al., "Traveling Wave Parametric Amplifier based on a chain of Coupled Asymmetric SQUIDs", arXiv:1509.04573 [cond-mat. supr-con], Sep. 15, 2015.
Bell, et al, "SQUID Based Superconducting Traveling-Wave Parametric Amplifier", IEEE/CSC & ESAS Superconductivity News Forum (global edition), Oct. 2014, 3 pages.
Benatti et al., "Testing Macroscopic Quantum Coherence", Il Nuovo Cimento B 110, No. 5-6, pp. 593-610, 1995.
Benjamin, "Schemes for Parallel Quantum Computation Without Local Control of Qubits", arXiv:quant-ph/99099007v2, Sep. 18, 1999, 12 pages.
Benjamin, Quantum Computing Without Local Control of Qubit-Qubit Interactions, 2001, 4 pages.
Berkley et al., "Systems and Methods for Operating a Quantum Processor to Determine Energy Eigenvalues of a Hamiltonian," U.S. Appl. No. 61/832,645, filed Jun. 7, 2013, 51 pages.
Biamonte et al., "Realizable Hamiltonians for universal adiabatic quantum computers," arXiv:0704.1287v2, Jun. 17, 2008, 7 pages.
Blais et al., "Operation of universal gates in a solid-state quantum computer based on clean Josephson junctions between d-wave superconductors", Physical Review A, 61, Apr. 23, 2008, 2000.
Blais et al., "Quantum netWork optimization", Physical Review A, 64, pp. 022312-1 to 022312-5 (2001).
Blais et al., "Tunable Coupling of Superconducting Qubits," arXiv:cond-mat/0207112v3 [cond-mat.mes-hall], Mar. 18, 2003, 4 pages.
Blatter et al., "Engineering Superconducting Phase Qubits", Los Alamos National Laboratory pre-print cond-met/9912163, 1999.
Blatter et al., "Design aspects of superconducting-phase quantum bits," Physical Review B 63: 174511-1-174511-9, 2001.
Bocko et al., "Prospects for Quantum Coherent Computation Using Superconducting Electronics," IEEE Transactions on Applied Superconductivity 7(2):3638-3641, Jun. 1997.
Boothby et al., "Architectural considerations in the design of a third-generation superconducting quantum annealing processor", arXiv: 2108.02322v1, Aug. 2021, pp. 3-4; and figure 4.
Bravyi et al., "The Complexity of Stoquastic Local Hamiltonian Problems," arXiv:quant-ph/0606140v4, Oct. 2, 2007, 21 pages.
Bravyi, et al., "Hight-threshold and low-overhead fault-tolerant quantum memory", arXiv:2308.07915v1 [quant-ph] Aug. 15, 2023, 38 pages.
Bravyi, et al., "Universal quantum computation with ideal Clifford gates and noisy ancillas", arXiv:quant-ph/0403025v2 Dec. 16, 2004, 15 pages.
Briegel et al., "Quantum repreaters for Communication", arXiv. org:quant-ph/9803056, pp. 1-8 (1998), 1998.
Brown, et al., "A fault-tolerant non-Clifford gate for the surface code in two dimensions", Science Advances, May 22, 2020, vol. 6, Issue 21, 25 pages.
Buisson et al., "Entangled states in a Josephson charge qubit coupled to a superconducting resonator", arXiv.org:cond/mat/ 0008275v1, Aug. 18, 2000.
Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.
Burkard et al., "Spintronics and Quantum Dots for Quantum Computing and Quantum Communication," Fortschritte der Physik 48, pp. 965-986, 2000.
Calderbank, et al., "Good quantum error-correcting codes exist", Phys. Rev. A54, 1098—Published Aug. 1, 2996, 4 pages.
Carelli et al., "SQUID Systems for Macroscopic Quantum Coherence and Quantum Computing", IEEE trans. Apple. Supercond., Mar. 1, 2001. https://ieeexplore.ieee.org/document/919321.
Chamberland et al, "Building A Fault-Tolerant Quantum Computer Using Concatenated Cat Codes", arXiv:2012.04108v2 [quant-ph] Jan. 27, 2022,117 page.

Chamon, et al., "A superconducting circuit realization of combinatorial gauge symmetry", arXiv:2006.10060v1 [quant-ph] Jun. 17, 2020, 9 pages.
Chancellor et al., "Circuit design for multi-body interactions in superconducting quantum annealing systems with applications to a scalable architecture", arXiv:1603.09521v5, Oct. 13, 2017.
Chapman et al., "General Purpose Multiplexing Device for Cryogenic Microwave Systems," arXiv:1603.02716v2 [quant-ph] May 31, 2016, 10 pages.
Christopher Eichler et al., 'Controlling the dynamic range of a Josephson parametric amplifier', EPJ Quantum Technology, vol. 1, No. 2, Jan. 29, 2014.
Clarke et al., "Superconducting quantum bits," Nature 453:1031-1042, Jun. 19, 2008.
Born , et al., Born et al., "Fabrication of Ultrasmall Tunnel Junctions by Electron Beam Direct-Writing", IEEE, 11(1) Mar. 2001, 4 pages.
Il'Ichev , et al., "Nonsinusoidal Current-Phase Relationship of Grain Boundary Josephson junctions in High-Tc Superconductors", Physical Review Letters 81, 1998, 4 pages.
Cory et al., "NMR Based Quantum Information Processing: Achievements and Prospects", Fortschritte der Physik 48, pp. 875-907, 2000.
Cosmelli et al, "An Integrated System of SQUIDs for the Study of Macroscopic Quantum Coherence", Supercond. Sci. Technol. 14, 2001.
Costabile et al., "rf-Induced steps in intermediate length Josephson-tunnel junctions", J Appl Phys 63, pp. 5406-5410 (1988), 1988.
Cottet et al., "Implementation of a combined charge-phase quantum bit in a superconducting circuit", Physica C 367, pp. 197-203, 2002.
De Bruyn Ouboter et al., "Multi-terminal SQUID controlled by the transport current", Physica B 205, pp. 153-162 (1995), 1995.
Deutsch, "Quantum theory, the Church-Turing principle and the universal quantum computer," Appeared in Proceedings of the Royal Society of London A 400: 97-117, 1985.
Devoret et al., "Superconducting Circuits for Quantum Information: An Outlook," Science 339:1169-1174, Mar. 8, 2013.
Devoret et al., "Superconducting Qubits: A Short Review," arXiv:cond-mat/0411174v1, Nov. 7, 2004, 41 pages.
Devoret, "Josephson-based Parametric Amplifiers for Quantum Measurements", Quantum-Mechanical Electronics Lab, Applied Physics and Physics, Yale University, Nov. 9, 92 pages.
Devoret, et al., "Introduction to Quantum-limited parametric Amplification of Quantum Signals with Josephson Circuits", arXiv:1605. 00539v2, May 25, 2016, 28 pages.
Dimoulas et al., "Phase-dependent resistance in a superconductor two dimensional electron gas quasiparticle interferometer", Physical Review Letters, 74, pp. 602-605, 1995.
DiVincenzo, "The Physical Implementation of Quantum Computation," arXiv:quanti-ph/0002077v3, Apr. 13, 2000.
Dykman, "Quantum Computing Using Electrons Floating on Liquid Helium", Fortschritte der Physik 48, pp. 1095-1108, 2000.
Eddins, et al, "Josephson Parametric Amplifiers: Theory and Application", Quantum Nanoelectronics Laboratory, Department of Physics, University of CA, Berkley, Workshop on Microwave Cavity Design for Axion Detection Livermore Valley Open Campus, Aug. 2015.
Ettinger et al., "An Integrated 20 GHZ SiGe Bipolar Differential Oscillator With High Tuning Range".
Feldman et al., "Josephson Junctions Digital Circuits", FED Report, Feb. 1998, 22 pages.
Feynman, "Simulating Physics with Computers," International Journal of Theoretical Physics 21(6/7): 467-488, 1982.
Fiory et al., "Metallic and superconducting surfaces of YBa2Cu3O7 probrd by electrostatic charge modulation of epitaxial films", Physical Review Letters, 65, pp. 3441-3444, 1990.
Fowler, et al., "Surface codes: towards practical large-scale quantum computation", Phys. Rev. A 86, 032324—Published Sep. 18, 2012, 5 pages.
Frey et al., "Mechanism of the electric field effect in the high Tc couprates", Physical Review B, 51, pp. 3257-3260, 1995.
Friedman et al., "Aharonov-Casher-Effect Suppression of Macroscopic Tunneling of Magnetic Flux," arXiv:cond-mat/0109544v1 [cond-mat.mes-hall], Sep. 28, 2001, 9 pages.

(56) References Cited

OTHER PUBLICATIONS

Friedman et al., "Quantum superposition of distinct macroscopic states," Nature 406:43-46, Jul. 6, 2000.
Geim et al., "Ballistic Hall micromagnetometry", Applied Physics Letters, 71, pp. 2379-2381, 1997.
Gottesman, et al., "Stabilizer Codes and Quantum Error Correction", arXiv:quant-ph/9705052v1, May 28, 1997, 122 pages.
Gotz et al., "Harmonic current-phase relation in Nb-Al-based superconductor/ normal conductor/ superconductor-type Josephson junctions betWeen 4.2 K and the critical temperature", ApplPhys. Lett. 77, pp. 1354-1356 (2000).
Grangier et al., "Implementations of Quantum Computing Using Cavity Quantum Electrodynamics", Fortschritte der Physik 48, pp. 859-874, 2000.
Greenberg et al., "Low-frequency characterization of quantum tunneling in flux qubits", ArXiv.org preprint server: cond-mat/0208076, last accessed on Aug. 20, 2004.
Grover, "A fast quantum mechanical algorithm for database search", Proceedings of the 28th Annual ACM Symposium on the Theory of Computing, pp. 212-219 (1996).
Han et al., "Time-Resolved Measurement of Dissipation-Induced Decoherence in a Josephson Junction," Science 293:1457-1459, Aug. 24, 2001.
Harris et al., 'A Compound Josephson Junction Coupler for Flux Qubits With Minimal Crosstalk', arXiv:0904.3784v3, Jul. 2009.
Harris et al., "Experimental Demonstration of a Robust and Scalable Flux Qubit," arXiv:0909.4321v1, Sep. 24, 2009, 20 pages.
Hartog et al., "Transport in Multiterminal Normal Superconductor Devices: reciprocity relations, Negative and nonlocal resistances, and reentrance of the Proximity Effect", Physical Review Letters, 77, pp. 4954-4957, 1996.
Hekking et al., "Cooper Pair BOX Coupled to a Current-Biased Josephson Junction", arXiv.org:cond-mat/0201284 (2002).
Horsman, et al., "Surface code quantum computing by lattice surgery", 2012 Journal of Physics, 14 Dec. 30, 2011, 28 pages.
Hu et al., "Decoherence and dephasing in spin-based solid state quantum computers", arXiv.org:cond-mat/0108339v2, Sep. 6, 2001, (2001).
Il'ichev et al., "Characterization of superconducting structures designed for qubit realizations", Appl. Phys. Lett. 80, pp. 4184-4186, 2002.
Il'ichev et al., "Degenerate Ground State in a Mesoscopic YBa2Cu3O7-x Grain Boundary Josephson Junction", Phys. Rev. Lett. 86, pp. 5369-5372, 2001.
Il'ichev et al., "Extra-Substrate Control System", U.S. Appl. No. 60/372,958, filed Apr. 15, 2002, 29 pages.
Il'ichev et al., "Radio-frequency based monitoring of small supercurrents", Rev. Sci. Instrum. 72, pp. 1882-1887, 2001.
Il'ichev et al., "Radio-frequency method for characterization of superconducting weak links," Physica C 350, pp. 244-248, 2001.
Il'ichev et al., "Temperature dependence of the current-phase relation for YBa2Cu3O7-x step-edge Josephson junctions", App. Phys. Lett. 72, pp. 731-733, 1998.
International Search Report & Written Opinion (PCT/US2020/065150)—Apr. 13, 2021.
International Search Report and Written Opinion for PCT/US2022/012000 mailed Apr. 21, 2022, 11 pages.
International Search Report and Written Opinion for PCT/US2022/081515 dated Jan. 18, 2024, 9 pages.
International Search Report and Written Opinion for PCT/US2023/073045 dated Jan. 9, 2024 in 9 pages.
Ioffe et al., "Environmentally decoupled sds-Wave Josephson junctions for quantum computing", Nature 398, pp. 679-681 (1999).
Ivanov et al., "Field effect transistor based on a bi-crystal boundary Josephson Junction", IEEE Transactions on Applied Superconductivity, 3, pp. 2925-2928, 1993.
Ivanov et al., "Three terminal Josephson Junction with a Semiconductor Accumulation Layer", Japanese Journal of Applied Physics, 26, supplement 3, pp. 1617, 1987.
James et al., "Scanning Hall probe Microscope images of Field penetration into niobium fields", Physica C 332, pp. 445-449, 2000.
Orlando et al, "Flux-based Superconducting Qubits for Quantum Computation" Physica C 372-376, 194-200, 2002.
Jiang et al., "New FET using the superconducting phase transition of a high temperature oxide superconductor", Superconductor Science and Technology, 4, pp. 468-470, 1991.
Johnson et al., "Scalable Control System for a Superconducting Adiabatic Quantum Optimization Processor," arXiv:0907.3757v1. Jul. 22, 2009. [online] Available. chrome-extension://efaidnbmnnnibpcajpcglclefindmkaj/https://arxiv.org/pdf/0907.3757v1.pdf.
Jones et al., "Implementation of a quantum search algorithm on a quantum computer", Nature 393, pp. 344-346 (1998).
Jones et al., Tunable electromagnetic environment for supercomputing, Jun. 13, 2013, Scientific Reports, pp. 1-5 (Year:2013).
Jonker et al., "On quantum and classical computing with arrays of superconducting persistent current qubits", Proceedings fifth IEEE International workshop on computer architectures for machine perception, Padova, italy, 11-13 Spe 2000, pp. 69-78,.
Joyez et al., "Observation of Parity-Induced Suppression of Josephson Tunneling in the Superconducting Single Electron Transistor", Physical Review Letters, 72(15)12458 2461, (1994).
Kane et al., "Silicon-based Quantum Computation", Fortschritte der Physik 48, pp. 1023-1041, 2000.
Ketchen, "Integrated Thin Film dc-SQUID sensors", IEEE Transactions on Magnetics 23, pp. 1650-1657, 1987.
Kirtley et al., "Direct Imaging of Integer and Half-Integer Josephson Junction Vortices in High Tc Grain Boundaries", Physical Review Letters, 76, pp. 1336-1339, 1996.
Kitaev et al., "Quantum measurements and the Abelian StabiliZer Problem", arXiv:quant-ph/9511026, pp. 1-22 (1995).
Kitaev, "Fault-tolerant quantum computation by anyons", arXiv:quant-ph/9707021v1 Jul. 9, 1997, 27 pages.
Knill et al., "Resilient Quantum Computation", Science 279, pp. 342-345 (1998).
Knill, Fault-Tolerant Postselected Quantum Computation: Schemes, arXiv:quant-ph/0402171v1, Feb. 23, 2004, 17 pages.
Ko, et al., "A Novel Method for Correcting Device Parameter Mismatches in Josephsen Junction Circuits", IEEE Transitions on Applied Superconductivity, vol. 3, No. 1. Mar. 1993, 4 pages.
Korotkov et al., "Charge Sensitivity of Radio-Frequency Single Electron Transistor", Appl. Phys. Lett. 74, pp. 4052-4054 (1999).
Krech, "Linear Microwave Response of a Charge-Type Qubit", IEEE Trans. Appl. Supercond. 11, pp. 1022-1025, 2001.
Kulik et al., "Quantum Computational Gates With Radiation Free Couplings", WWW.arXiv.org preprint1 cond-mat/0203313 v1 (Mar. 14, 2002).
Lechner et al., "A quantum annealing architecture with all-to-all connectivity from local interactions", Science Advances. Oct. 23, 2015. https://advances.sciencemag.org/content/1/9/e1500838.
Leggett et al., "Dynamics of the dissipative tWO—state system", Reviews of Modern Physics, 59, pp. 1-85, Jan. 1, 1987.
Lidar et al., "Quantum Codes for Simplifying Design and Suppressing Decoherence in Superconducting Phase—Qubits", Quant. Inf. Proc. 1, pp. 155-182, 2002.
Lidar et al., "Reducing Constraints on Quantum Computer Design by Encoded Selective Recoupling", Phys. Rev. Lett. 88, 017905, pp. 1-4, 2002.
Litinski, et al., "A Game of Surface Codes: Large-Scale Quantum Computing with Lattice Surgery", arXuv:1808.0289.02892v3 [quant=ph] Feb. 3, 2019, 37 pages.
Lombardi et al., "Transport and structural properties of the top and bottom grain boundaries on YBa2Cu3O7 step edge Josephson Junctions", Applied Physics Letters, 72, pp. 249-251, 1998.
Macklin, et al., "A near-quantum-limited Josephson traveling-wave parametric amplifier", Science Sciencemag. org,, Oct. 16, 2015 vol. 350, Issue 6258, 5 pages.
Majer et al., "Simple phase bias for superconducting circuits", Applied Physics Letters 80 pp. 3638-3640, 2002.
Makhlin et al., "Josephson-Junction Qubits", Fortschritte der Physik 48, pp. 1043-1054, 2000.

(56) References Cited

OTHER PUBLICATIONS

Makhlin et al., "Nano-electronic circuits as quantum bits", ISACS 2000 Geneva. IEEE International Symposium on Circuits and Systems. Emerging Technologies of the 21st century Geneva, Switzerland, Mar. 28-32, 2000, pp. 241-244 vol. 2, Mar. 1, 2000.

Makhlin et al., "Quantum-state engineering with Josephson-junction devices," Reviews of Modern Physics, vol. 73, Apr. 2001, 44 pages.

Mannhart et al., "Anomalous dependence of the critical current of 45 grain boundaries in YBa2Cu3O7-x on an applied magnetic field", Zeitschrift fur Physik B, 101, pp. 175-179, 1996.

Mannhart et al., "High-Tc transistors", Superconductor Science and Technology, 9, pp. 49-67, 1996.

Mannhart et al., "Influence of electric fields on pinning in YBa2Cu3O7 films", Physical Review Letters, 67, pp. 2099-2101, 1991.

Mannhart et al., "Large electric field effetcs in YBa2Cu3O7 films containing weak links", Applied Physics letters, 62, pp. 630-632, 1992.

Manucharyan, et al., "Fluxonium: single Cooper Pair circuit free of charge offsets", arXiv:0906.0831v2 [cond-mat.mes-hall] Oct. 20, 2009, 13 pages.

Marquardt et al., "Superposition of tWo mesoscopically distinct quantum states: Coupling a Cooper-pair box to a large superconducting island", Physical Review B, 63, pp. 054514-054520 (2001).

Martinis et al., "Rabi Oscillations in a Large Josephson-Junction Qubit," Physical Review Letters 89(11):117901-1-117901-4, Sep. 9, 2002.

Martinis, "Superconducting phase qubits," Quantum Inf Process 8:81-103, 2009.

Mizuta, et al., "Quantum and Tunnelling Capacitance in Charge and Spin Qubits", arXiv:1604.02884v2 [cond-mat.mes-hall] Aug. 16, 2016, 9 pages.

Mooij et al., "Josephson Persistent-Current Qubit," Science 285:1036-1039, Aug. 13, 1999.

Naaman et al., "On-Chip Josephson Junction Microwave Switch," arXiv:1512.01484v1, 10 pages.

Nagayama, et al., "Sureface code error correction on a defective lattice", IOP Publishing, New J. Phys. 19 (2017) 29 pages.

Nakajima et al., "Field Effects on the dielectric property of YBCO bicrystal grain boundary junctions", IEEE Transactions on Applied Superconductivity, 5, pp. 2861-2863, 1995.

Nakamura et al., "Coherent control of macroscopic quantum states in a single-Cooper-pair-box," Nature 398:786-788, Apr. 29, 1999.

Neill, "A path towards quantum supremacy with superconducting qubits", PHD Thesis—University of California, Dec. 1, 2017.

Neven, "Suppressing quantum errors by scaling a surface code logical qubit", arXiv:2207.06431v1 [quant-ph] Jul. 13, 2022, 44 pages.

Nguyen et al, "Scalable High-Performance Fluxonium Quantum Processor", arXiv:2201.09374v2 [quant-ph] Feb. 5, 2022, 29 pages.

Non Final Office Action for U.S. Appl. No. 16/996,355, mailed Oct. 17, 2022, 12 pages.

Olariu et al., "The quantum effects of electromagnetic fluxes," Reviews of Modern Physics, vol. 57, No. 2, Apr. 1985.

Oral et al., "Microscopic measurements of penetration depth in YBa2Cu3O7-d thin films by scanning Hall probe microscopy", Superconductor Science and Technology 10, pp. 17-20, 1997.

Oral et al., "Real time scanning Hall probe microscopy", Applied Physics Letters, pp. 1324-1326, 1996.

Orlando et al., "Engineering the Quantum Measurement Process for the Persistent Current Qubit", Physica C 3681294-299 (Mar. 2002).

* cited by examiner

PRIOR ART

FIGURE 1A

PRIOR ART

SYSTEMS AND METHODS FOR TUNING CAPACITANCE IN QUANTUM DEVICES

FIELD

This disclosure generally relates to quantum computing, and particularly to the design and operation of devices for tuning the physical characteristics of quantum devices.

BACKGROUND

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. A superconducting circuit is a circuit that includes a superconducting device. A superconducting device is a device that includes a superconducting material. A superconducting material is a material that has no electrical resistance below critical levels of current, magnetic field, and temperature. Both spin and superconductivity are quantum mechanical phenomena. Superconductivity is a physical phenomenon that was well known in the art at the time of filing of the present application. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are quantum binary digits, known as qubits. Quantum computers hold the promise of providing exponential speedup for certain classes of computational problems such as computational problems simulating quantum physics. Useful speedup may exist for other classes of problems.

One model of quantum computing is adiabatic quantum computing. Adiabatic quantum computing can be suitable for solving hard optimization problems, for example. Further details on adiabatic quantum computing systems, methods, and apparatus are described, for example, in U.S. Pat. Nos. 7,135,701 and 7,418,283.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing. In quantum annealing, thermal effects and other noise may be present. The final low-energy state may not be the global energy minimum.

Adiabatic quantum computation may be considered a special case of quantum annealing. In adiabatic quantum computation, the system ideally begins and remains in its ground state throughout an adiabatic evolution. Thus, those of skill in the art will appreciate that quantum annealing systems and methods may generally be implemented on an adiabatic quantum computer. Throughout the present application, any reference to quantum annealing is intended to encompass adiabatic quantum computation unless the context requires otherwise.

Superconducting Qubits

A quantum processor can be a superconducting quantum processor that includes superconducting qubits. Wendin G. and Shumeiko V. S., "SUPERCONDUCTING QUANTUM CIRCUITS, QUBITS AND COMPUTING" (arXiv:cond-mat/0508729v1, 2005), provides an introduction to the physics and principles of operation of quantized superconducting electrical circuits for quantum information processing.

Coupling

Couplers can provide communicative coupling between quantum devices in a quantum processor. Coupling can be, for example, between adjacent and/or non-adjacent qubits. Unless expressly indicated otherwise, as used herein and in the claims, the terms couple, couples, coupling and variations of such means direct or indirect communicative coupling or communications between two or more components.

Quantum devices, such as qubits and couplers, may possess various characteristics, such as flux, persistent current, inductance, capacitance, and so on. Such characteristics can affect the results of quantum computations performed by such qubits, and so it can be desirable to tune one or more of those characteristics to align with the parameters of a given computation. Example systems and methods for tuning qubit characteristics, including example qubits and couplers, are provided by U.S. Pat. No. 9,152,923 and PCT Application No. US2018/066613.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to tune certain physical characteristics of quantum devices, such as capacitance. Aspects of the present disclosure provide a quantum system having qubits with tunable capacitance. The quantum system comprises: a qubit comprising: a qubit loop formed by a first superconducting current path, a first Josephson structure comprising at least one Josephson junction, the Josephson junction interrupting the qubit loop, and a first capacitor shunting the Josephson structure and electrically parallel with the Josephson structure; and a first coupling interface interrupting the qubit loop and electrically parallel with the first capacitor; a capacitance loop comprising a second capacitor and a second coupling interface; and a tunable coupler coupleable to the qubit via the first coupling interface and the coupleable to the capacitance via the second coupling interface.

In some implementations, the first coupling interface comprises a first inductor inductively coupleable to the tunable coupler and the second coupling interface comprises a second inductor inductively coupleable to the tunable coupler, the first and second inductors forming a mutual inductance. In some implementations, the coupler galvanically connects the first coupling interface and the second coupling interface electrically in parallel. In some implementations, the coupler has a maximum ferromagnetic coupling strength below a threshold, the threshold corresponding to an LC-resonant frequency of the coupler outside of a bandwidth of the qubit.

In some implementations, the tunable coupler comprises: a coupler loop coupleable to the first and second coupling interfaces; and a tuning interface interrupting the coupler loop. In some implementations, the tuning interface comprises one or more Josephson junctions. In some implementations, the tuning interface comprises a compound Josephson junction comprising a plurality of Josephson junctions. In some implementations, the system comprises a flux bias operable to bias flux in the tuning interface based on a programming signal.

Aspects of the present disclosure provide a method for tuning an effective capacitance of a qubit in a quantum processor and a system to perform the method. The method is performed by a processor in communication with the quantum processor and comprises: determining a target capacitance for the qubit; determining a predicted capacitance for the qubit; determining a capacitance increment based on the target and predicted capacitances, and based on a capacitance of a capacitance loop; and tuning the effective capacitance of the qubit by causing the quantum processor to assign a coupling strength to a coupler that couples the qubit to the capacitance loop based on the capacitance increment, the resonant frequency of the coupler remaining fixed under variation of the coupling strength.

In some implementations, the method comprises receiving a problem. Determining the predicted capacitance comprises determining a predicted capacitive loading of the qubit based on one or more couplings between the qubit and one or more respective other quantum devices, the one or more couplings based on the problem.

In some implementations, determining the target capacitance comprises retrieving a target capacitance shared by a plurality of qubits including the qubit and determining the capacitance increment comprises determining a difference between the predicted capacitance and the target capacitance. In some implementations, the method comprises determining a respective capacitance increment for each qubit of the plurality of qubits and tuning the effective capacitance of each qubit of the plurality of qubits based on the target capacitance.

In some implementations, causing the quantum processor to assign the coupling strength to the coupler comprises causing the quantum processor to assign the coupling strength to the coupler based on a square root of the capacitance increment.

In some implementations, the method comprises receiving a problem, causing the quantum processor to execute the problem based on the tuning the effective capacitance of the qubit, and receiving from the quantum processor an output state based on the problem and resulting from the causing the quantum processor to execute the problem.

Aspects of the present disclosure provide a computational system, comprising at least one processor in communication with a quantum processor, and at least one nontransitory processor-readable storage medium that stores at least one of processor-executable instructions or data which, when executed by the at least one processor cause the at least one processor to: determine a target capacitance for a qubit of the quantum processor, determine a predicted capacitance for the qubit, determine a capacitance increment based on the target and predicted capacitances and based on a capacitance of a capacitance loop, and tune an effective capacitance of the qubit by causing the quantum processor to assign a coupling strength to a coupler coupling the qubit to a capacitance based on the capacitance increment, a resonant frequency of the coupler remaining fixed under variation of the coupling strength.

In some implementations the at least one of processor-executable instructions or data may further cause the at least one processor to receive a problem and determine a predicted capacitive loading of the qubit based on one or more couplings between the qubit and one or more respective other quantum devices, the one or more couplings based on the problem to determine the predicted capacitance for the qubit, the at least one of processor-executable instructions or data may further cause the at least one processor to retrieve a target capacitance shared by a plurality of qubits including the qubit and determine a difference between the predicted capacitance and the target capacitance to determine the capacitance increment, the at least one of processor-executable instructions or data may further cause the at least one processor to determine a respective capacitance increment for each qubit of the plurality of qubits and tune the effective capacitance of each qubit of the plurality of qubits based on the target capacitance, the at least one of processor-executable instructions or data may further cause the at least one processor to assign the coupling strength to the coupler based on a square root of the capacitance increment, and/or the at least one of processor-executable instructions or data may further cause the at least one processor to receive a problem, cause the quantum processor to execute the problem based on the tuning the effective capacitance of the qubit, and provide an output state based on the execution of the problem.

In some implementations, the features described above may be combined together in any reasonable combination as will be recognized by those skilled in the art.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1A:
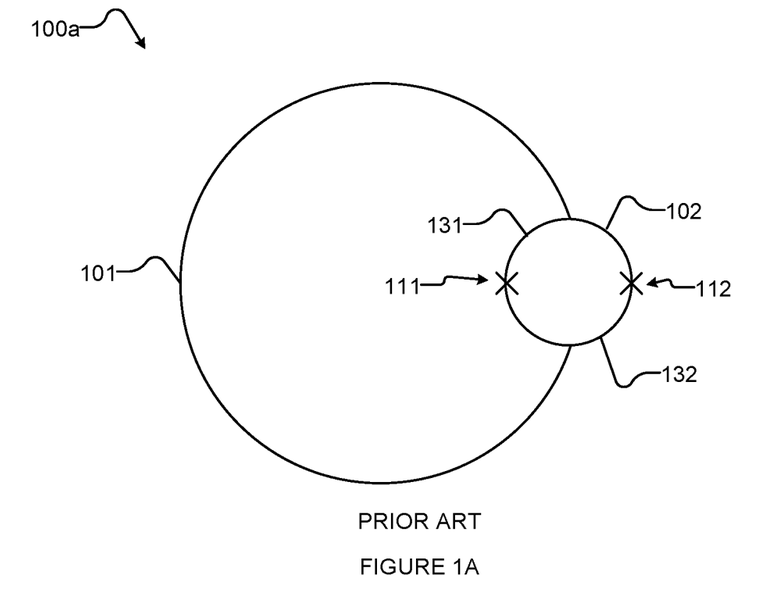
FIG. 1A is a schematic diagram of a prior art qubit.

FIG. 1A is a schematic diagram of a superconducting flux qubit 100a. Qubit 100a comprises a first superconducting loop 101 that is interrupted by a second superconducting loop 102, which is itself interrupted by two Josephson junctions 111 and 112. Superconducting loop 101 is referred hereinafter to as the "qubit loop" while superconducting loop 102 is referred to as the compound Josephson junction ("CJJ") structure. CJJ structure 102 comprises current paths 131, 132, each of which is interrupted by a respective Josephson junction 111, 112.

Figure 1B:
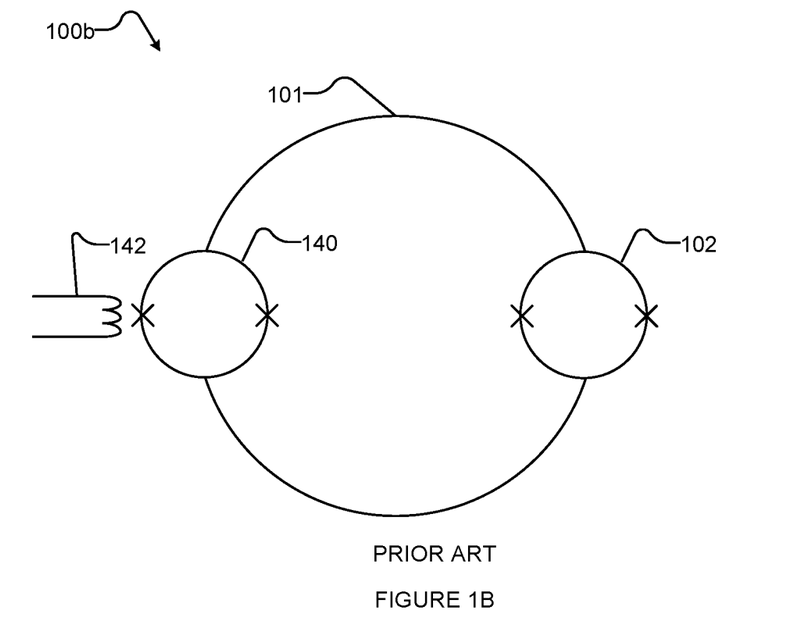
FIG. 1B is a schematic diagram of a prior art qubit with an inductance tuner.

FIG. 1B is a schematic diagram of a superconducting flux qubit 100b. Qubit 100b comprises first superconducting loop 101 and CJJ structure 102, substantially similarly to qubit 100a. Qubit 100b further comprises an inductance tuner (or "L-tuner") CJJ structure 140 connected in series with CJJ structure 102 in qubit loop 101. As described, for example, in U.S. Pat. No. 9,152,923, L-tuner CJJ structure 140 may be tuned using a programmable interface 142, such as by inductively coupling control signals to L-tuner CJJ structure 140 and thus tuning the Josephson inductance of L-tuner CJJ structure 140 and, by extension, of qubit 100b.

Qubits 100a and 100b may be coupled to other devices inductively or otherwise. For example, in some implementations, qubits 100a and 100b are inductively coupled to other qubits via inter-qubit couplers (not shown). Such couplings can affect the electromagnetic properties of qubits 100a, 100b. For example, the capacitance of qubit 100b may be a complex function of both coupler and L-tuner settings. Although in the past this effect may have been small enough to ignore in practice, as quantum processors scale up, experiments have shown that the effect may increase. For example, in some implementations, tuning both couplers and L-tuners can cause changes in qubit capacitance on the order of 10 fF, potentially causing errors in calibration, coupler-dependent desynchronization of qubit dynamics, and other difficult-to-address behaviour.

Moreover, it is noted that existing capacitance-tuning techniques (such as the LC circuit of U.S. Pat. No. 9,152,923) can shift the LC-resonant frequency of at least a portion of a qubit's qubit loop to drop within the qubit's bandwidth. This can cause the eigenstates of the qubit to become those of a qubit hybridized with a ladder of harmonic oscillator states (e.g. in the case of a flux qubit). This can make it difficult or impossible to isolate the qubit state from the setting of the capacitance tuner.

Figure 2:
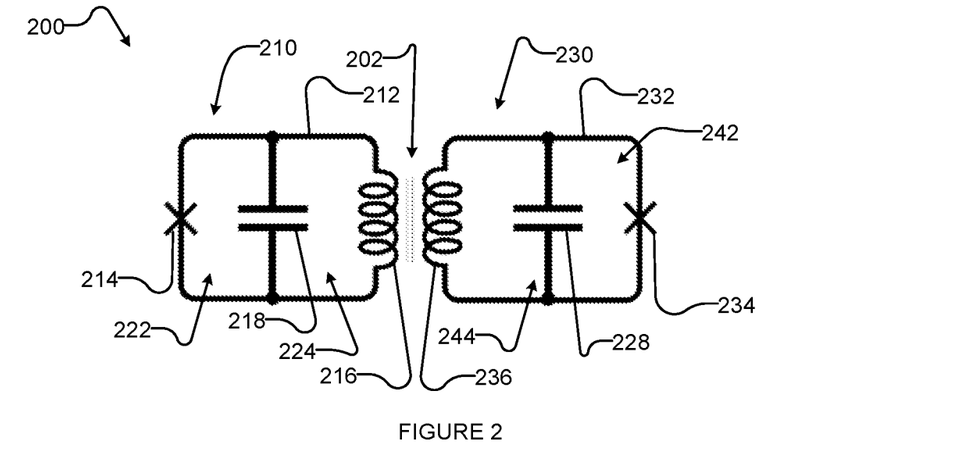
FIG. 2 is a schematic diagram of an example quantum system comprising a qubit and a capacitive loop coupled by a mutual inductance.

FIG. 2 is a schematic diagram of a quantum system 200 comprising a qubit 210 and a coupler 230. Qubit 210 comprises a qubit loop 212 interrupted by a Josephson structure 214 and a coupling interface 216. Josephson structure 214 comprises at least one Josephson junction and may, for example, comprise a CJJ structure as described above. Josephson structure 214 possesses a critical current $I_1^c$. Coupling interface 216 may, for example, comprise an inductor possessing an inductance $L_1$. Josephson structure 214 is shunted by capacitor 218 having capacitance $C_1$.

In at least some implementations, qubit 210 is coupleable to coupler 230 by a mutual inductance 202 having inductance M. In some implementations, coupler 230 comprises a coupler loop 232 interrupted by a Josephson structure 234 and a coupling interface 236. Josephson structure 234 comprises at least one Josephson junction and may, for example, comprise a CJJ structure as described above. Josephson structure 234 possesses a critical current $I_2^c$. Coupling interface 236 may, for example, comprise an inductor possessing an inductance $L_2$. Josephson structure 234 may be shunted by capacitor 228 having capacitance $C_2$.

In at least some implementations, the effective capacitance $C_1^{eff}$ of qubit 210 can be described based on the following formula:

$$C_1^{eff} = C_1 + \frac{1}{(1+\beta_2)^2} \frac{M^2}{L_1^2} C_2$$

where $\beta_2$ is a scaling term based on the characteristics of coupler 230. For example, for example coupler 230, $\beta_2$ may be described based on $\beta_2 = 2\pi L_2 I_2^c/\Phi_0$, where $\Phi_0$ is the single flux quantum.

Figure 3:
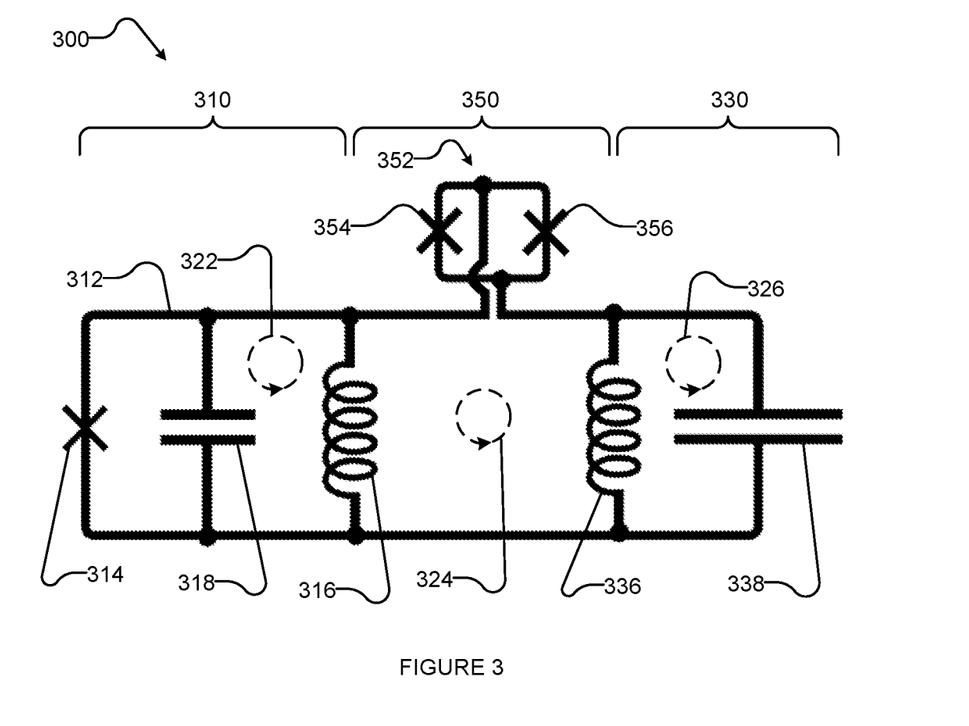
FIG. 3 is a schematic diagram of an example quantum system comprising a qubit and a capacitive loop coupled galvanically by a tunable coupler.

FIG. 3 is a schematic diagram of a quantum computing system 300 comprising a qubit 310 coupleable to capacitance loop 330 via a tunable coupler 350. Qubit 310 may be substantially similar to qubit 210, e.g., comprising a qubit loop 312 interrupted by a Josephson structure 314 and a coupling interface 316. Josephson structure 314 comprises at least one Josephson junction and may, for example, comprise a CJJ structure as described above. Josephson structure 314 possesses a critical current $I_q^c$. Coupling interface 316 may, for example, comprise an inductor possessing an inductance $M_{co\text{-}q}$. Josephson structure 314 is shunted by capacitor 318 having capacitance $C_q$.

Capacitance loop 330 comprises a capacitor 338 and a coupling interface 336. Coupling interface 336 may comprise, for example, an inductor possessing an inductance $M_{co\text{-}r}$. In at least some implementations capacitance loop 330 does not require elements such as Josephson structure 234, although such additional and/or alternative elements may optionally be provided.

In at least some implementations, qubit 310 is coupleable to capacitance loop 330 by a tunable coupler 350. In some implementations, coupler 350 is galvanically coupled to qubit 310 and coupler 350, e.g., across coupling interfaces 316, 336. Tunable coupler 350 provides a tuning interface 352. In some implementations, tuning interface 352 comprises a Josephson structure interrupting a coupler loop. For example, in the depicted example implementation of FIG. 3 tuning interface 352 comprises Josephson junctions 354, 356. Tuning interface 352 may be tuned via a programmable interface (e.g., programmable interface 142 as discussed above) that provides a programming signal or via any other suitable technique.

It may be noted that qubit 310, coupler 350, and capacitance loop 330 can be expected to possess respective inductances $L_q$ (depicted as 322), $L_{co}$ (depicted as 324), and $L_r$ (depicted as 326).

Coupler 350 may be inductively and/or galvanically coupled to qubit 310 and capacitance loop 330. In some implementations coupler 350 is galvanically coupled to both qubit 310 and capacitance loop 330. In at least some circumstances, such mutually-galvanic couplings can provide stronger maximum coupling strength, smaller physical dimensions, or both relative to all-inductive couplings (such as the all-inductive coupling of the example implementation depicted in FIG. 2).

Coupling interface 336 will tend to cause some inductance shunting through capacitor 338, and therefore there will tend to be LC-resonance associated with capacitance loop 330. However, qubit 310 can be decoupled from capacitance loop 330 by tuning coupler 350 (e.g., by flux biasing tuning interface 352).

Note that, in implementations where a Josephson structure shunted by capacitor 338 (e.g., Josephson structure 234) is tuned, it can be difficult or even impossible to tune capacitance loop 330 without pushing its LC-resonant frequency into the bandwidth of qubit 310, thereby entangling their eigenstates and making it difficult or even impossible (in at least some circumstances) to isolate qubit 310 from capacitance loop 330. At least some implementations of system 300 avoid this problem, including the depicted implementation of FIG. 3, e.g., by tuning a CJJ structure 352 which is not shunted by capacitance loop 330.

In at least some implementations, the resonant frequency of capacitor 338 can be described by:

$$f_r = \frac{1}{2\pi M_{co\text{-}r} C_r}$$

where $C_r$ is the capacitance of capacitor 338. In at least some implementations, coupling interface 336 and capacitor 338 are provided respective physical characteristics $M_{co\text{-}r}$ and $C_r$ such that $f_r$ is outside of the bandwidth of qubit 310. For instance, for a qubit 310 with an operational range of 0-5 GHz, coupling interface 336 may comprise an inductor having inductance on the order of $M_{co\text{-}r} \approx 50$ pH and capacitance loop 330 may comprise a capacitor 338 having capacitance on the order of $C_r \approx 10$ pF. (Assuming a maximum coupling strength of $M \approx 10$ pH and qubit 310 inductance $L_q \approx 300$ pH, this implies a reasonably robust tuning range of $\delta C_q \approx 10$ fF.) In at least some implementations, this provides a resonant frequency on the order of 7 GHz—just outside the bandwidth of qubit 310.

Coupler 350 may provide ferromagnetic and/or anti-ferromagnetic coupling. In some implementations coupler 350 provides only ferromagnetic coupling. This regime is usually stronger than the anti-ferromagnetic regime (given couplers of similar size), and so can enable smaller devices. However, pushing coupler 350 too deep into the ferromagnetic regime can cause its own LC-resonance to fall within the qubit bandwidth. Accordingly, in at least some implementations coupler 350 provides ferromagnetic coupling with a maximum ferromagnetic coupling strength below a threshold, the threshold corresponding to an LC-resonant frequency of coupler 350 outside of a bandwidth of qubit 310.

The effective capacitance $C_q^{\text{eff}}$ of qubit 310 can be described, in at least some implementations of system 300, based on the following:

$$C_q^{\text{eff}} = C_q + \frac{M^2}{L_q^2} C_r$$

where $C_q$ is the capacitance of capacitor 318 of qubit 310, M is the coupling strength of coupler 350 (which may be tunable via tuning interface 352), and $L_q$ is the inductance of qubit 310. Qubit 310 may be further coupled to other devices, which may cause capacitive loading and thus affect its effective capacitance. Such capacitive loading may be counteracted (if desired and if practical for the given design and in the given circumstances) by tuning coupler 350 to increase or decrease $C_q^{\text{eff}}$, as appropriate.

Figure 4:
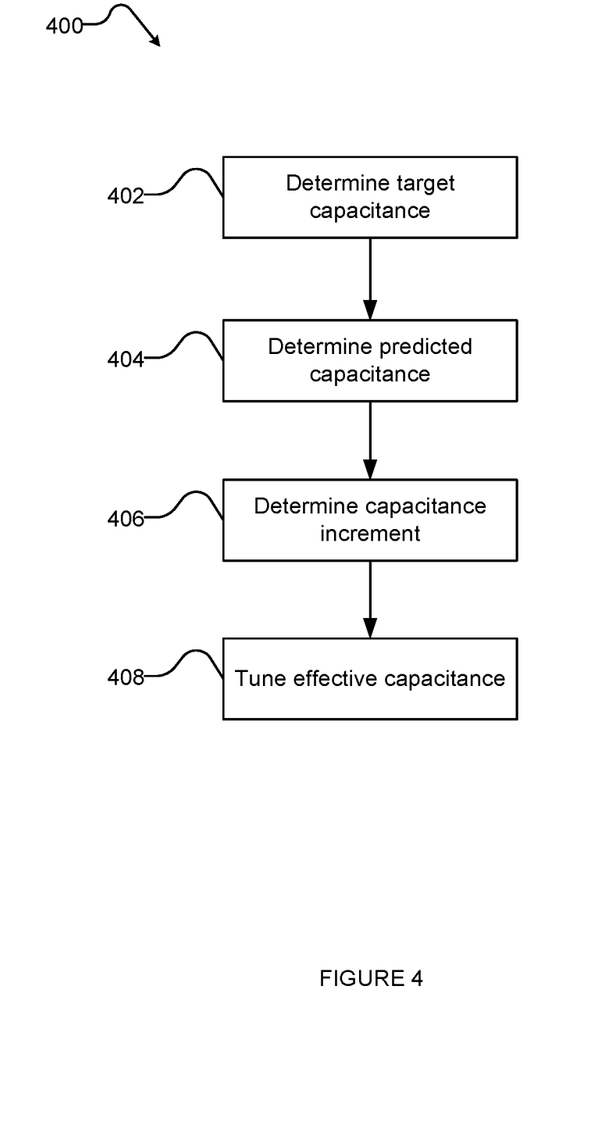
FIG. 4 is a flowchart of an example method for tuning the capacitance of an example quantum system, such as the quantum system of FIG. 3.

FIG. 4 is a flowchart of a method 400 for tuning the effective capacitance of a qubit. Method 400 may be performed by a computing system (comprising a processor and memory) in communication with a quantum processor. The quantum processor may comprise at least one of the quantum systems 200, 300 described above, and in particular comprises a qubit with tunable effective capacitance.

At 402, the computing system determines a target capacitance for the qubit. In some implementations, determining the target capacitance may comprise retrieving a target capacitance shared by a plurality of qubits (e.g., a calibrated capacitance for each qubit of the plurality of qubits), such that the capacitance increment would bring the qubit's capacitance approximately into alignment with the shared target capacitance.

At 404, the computing system determines a predicted capacitance for the qubit. In some implementations, determining a predicted capacitance comprises retrieving (e.g., from memory, a database, and/or another repository) an intrinsic capacitance of the qubit, e.g., based on a capacitance of a capacitor which the qubit comprises.

At 406, the computing system determines a capacitance increment for the qubit based on the target and predicted capacitances for the qubit and the capacitance of the capacitance loop in communication with the qubit.

At 408, the computing system tunes the effective capacitance of the qubit by causing the quantum processor to assign a coupling strength to the coupler coupling the qubit to the capacitance loop. The assigned coupling strength is determined based on the capacitance increment of act 406. The resonant frequency of the coupler remains fixed under variations of the coupling strength.

Assigning a coupling strength may comprise, for example, the computing system transmitting to the quantum processor a signal causing it to assign a coupling strength of a coupler coupling the qubit to a capacitance loop (e.g., as described above). Such assignment may comprise incrementing or decrementing an existing (and/or default) coupling strength. For example, assigning the coupling strength may comprise loading a flux bias into a tuning interface of the coupler. This is referred to below as assigning capacitance-tuning settings.

In some implementations, tuning the capacitance of the qubit comprises tuning a tunable coupler that is coupled electrically in parallel to both the qubit and the capacitance loop, so as to avoid the entangling of qubit and capacitance loop states mentioned elsewhere herein. Such calibration of qubits' capacitance is not necessarily based on a problem and may instead (or additionally) be directed to calibrating the qubits to have substantially uniform characteristics (namely capacitance). In some implementations, tuning the capacitance of the qubit comprises assigning a coupling strength of the qubit based on the capacitances of the qubit and the capacitance loop. For example, the coupling strength may be assigned proportionately to a square root of the capacitance increment. For example, the coupling strength M may be determined and set based on the following:

$$M = L_q \sqrt{\frac{C_q^t - C_q}{C_r}}$$

where $C_q^t$ is the target capacitance, $C_q$ is the predicted capacitance, and $C_r$ is the capacitance loop's capacitance (e.g., the capacitance of a capacitor interrupting the loop).

Figure 5:
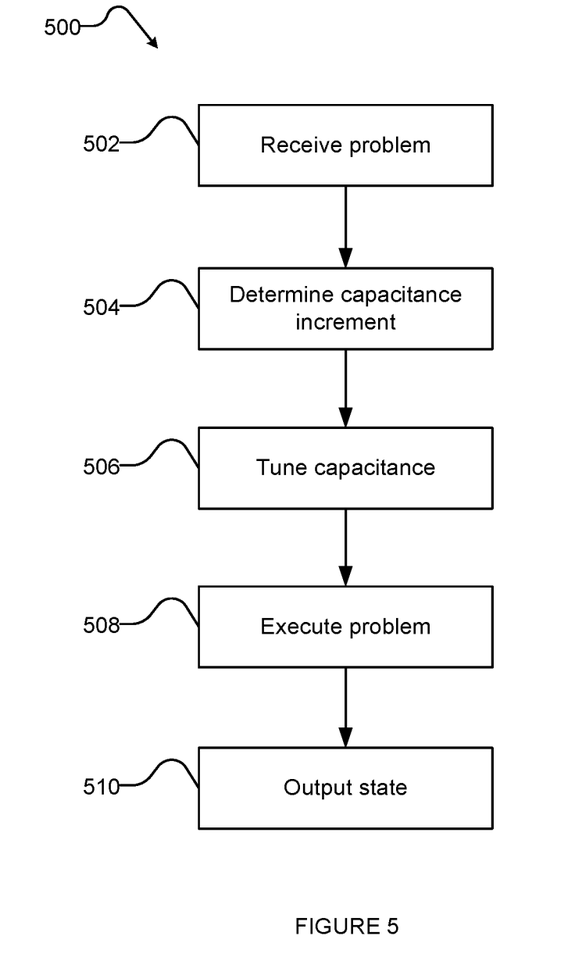
FIG. 5 is a flowchart of an example method of another implementation for tuning the capacitance of an example quantum system, such as the quantum system of FIG. 3.

FIG. 5 is a flowchart of a method 500 providing one implementation of the method 400 described above. It will be understood that acts 502-510 of method 500 may be included in method 400.

At 502, the computing system receives a problem for execution by the quantum processor. This problem may, for example, comprise a quadratic unconstrained binary optimization problem, a Hamiltonian, a waveform interpretable by the quantum processor, and/or any other suitable representation of a task for computation by the quantum processor.

At 504, the computing system determines a capacitance increment for the qubit. This may, for example, comprise determining a target capacitance for the qubit, determining a predicted capacitance for the qubit based on the problem, and determining the capacitance increment based on a difference between the target and predicted capacitances, as discussed in further detail with respect to method 400. In some implementations, determining a predicted capacitance for the qubit comprises determining a predicted capacitive loading of the qubit based on one or more couplings of the qubit with other devices derived from (and/or encoded by) the problem.

At 506, the computing system causes the quantum processor to tune the capacitance of the qubit, such as by causing the quantum processor to assign a coupling strength to the coupler coupling the qubit to the capacitance loop. As discussed above, calibration of qubits' capacitance may be based on a problem and/or may be directed to calibrating the qubits to have substantially uniform characteristics (namely capacitance).

At 508, the computing system causes the quantum processor to execute the problem while retaining the capacitance-tuning settings assigned at 506. At 510, the computing system receives from the quantum processor an output state resulting from the execution of the problem based on those capacitance-tuning settings.

Methods 400 and 500 may be performed by a computational system as discussed above. In some implementations, a computational system for performing methods 400 and 500 may include at least one processor in communication with a quantum processor, and at least one nontransitory processor-readable storage medium that stores at least one of processor-executable instructions or data, which, when executed by the at least one processor cause the at least one processor to implement method 400 or method 500.

Figure 6:
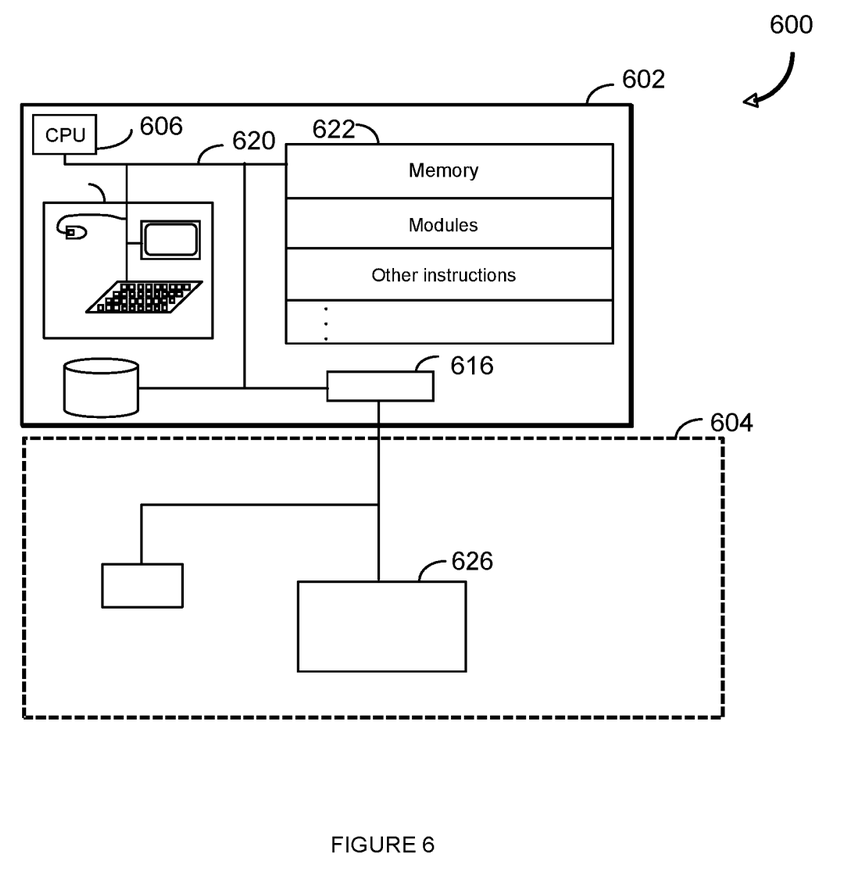
FIG. 6 is a schematic diagram illustrating a computing system comprising a digital computer and a quantum computer.

One implementation of a computational system 600 that may perform method 400 or method 500 is shown in FIG. 6. FIG. 6 illustrates a computational system 600 having a digital processor 606 and a quantum processor 626.

Classical computer 602 includes one or more digital processors 606 and may further include at least one system memory 622, and at least one system bus 620 that couples various system components, including system memory 622 to digital processor(s) 606. System memory 622 may include at least one nontransitory processor-readable storage medium that stores at least one of processor-executable instructions or data.

Digital processor(s) 606 may be any logic processing unit or circuitry (for example, integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations quantum computer 604 includes a quantum processor 604 with at least one superconducting integrated circuit that includes microwave sensitive components within microwave shielding layers, components fabricated with low noise dielectrics, and other components fabricated using systems and methods described in the present application. Quantum processor 626 may include at least one qubit with a tunable effective capacitance as described in greater detail herein. Quantum computer 604 may communicate with classical computer 602 via, for instance, a controller 616. Certain computations may be performed by quantum computer 604 at the instruction of digital computer 602, as described in greater detail herein. Quantum computer 604 may include other components, such as control systems and readout systems, that communicate with quantum processor 626.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added.

Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to:

U.S. Pat. No. 7,135,701
U.S. Pat. No. 7,418,283
U.S. Pat. No. 9,152,923
PCT Application No. US2018/066613
U.S. Provisional Application Nos. 62/896,996; 62/608, 501 and 62/693,305

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for tuning an effective capacitance of a qubit in a quantum processor, the qubit having an operational bandwidth, the method performed by a processor in communication with the quantum processor and comprising:
   determining a target capacitance for the qubit;
   determining a predicted capacitance for the qubit;
   determining a capacitance increment based on the target and predicted capacitances, and based on a capacitance of a capacitance loop, the capacitance loop having a resonant frequency that is outside the operational bandwidth of the qubit; and
   tuning the effective capacitance of the qubit by causing the quantum processor to apply a coupling strength to a coupler coupling the qubit to the capacitance loop based on the capacitance increment, a resonant frequency of the coupler remaining fixed under variation of the coupling strength.

2. The method according to claim 1 comprising receiving a problem and wherein determining the predicted capacitance comprises determining a predicted capacitive loading of the qubit based on one or more couplings between the qubit and one or more respective other quantum devices, the one or more couplings based on the problem.

3. The method according to claim 1 wherein determining the target capacitance comprises retrieving a target capacitance shared by a plurality of qubits including the qubit and determining the capacitance increment comprises determining a difference between the predicted capacitance and the target capacitance.

4. The method according to claim 3 comprising determining a respective capacitance increment for each qubit of the plurality of qubits and tuning the effective capacitance of each qubit of the plurality of qubits based on the target capacitance.

5. The method according to claim 1 wherein causing the quantum processor to apply the coupling strength to the coupler comprises causing the quantum processor to apply the coupling strength to the coupler based on a square root of the capacitance increment.

6. The method according to claim 1 further comprising:
   receiving a problem;
   causing the quantum processor to execute the problem based on tuning the effective capacitance of the qubit; and
   receiving from the quantum processor an output state based on the problem and resulting from causing the quantum processor to execute the problem.

7. A computational system, comprising:
   at least one processor in communication with a quantum processor; and
   at least one nontransitory processor-readable storage medium that stores at least one of processor-executable instructions or data which, when executed by the at least one processor cause the at least one processor to:
   determine a target capacitance for a qubit of the quantum processor, the qubit having an operational bandwidth;
   determine a predicted capacitance for the qubit;
   determine a capacitance increment based on the target and predicted capacitances and based on a capacitance of a capacitance loop, the capacitance loop having a resonant frequency that is outside the operational bandwidth of the qubit; and
   tune an effective capacitance of the qubit by causing the quantum processor to apply a coupling strength to a coupler coupling the qubit to a capacitance based on the capacitance increment, a resonant frequency of the coupler remaining fixed under variation of the coupling strength.

8. The computational system of claim 7 wherein the at least one of processor-executable instructions or data further cause the at least one processor to receive a problem and determine a predicted capacitive loading of the qubit based on one or more couplings between the qubit and one or more respective other quantum devices, the one or more couplings based on the problem to determine the predicted capacitance for the qubit.

9. The computational system of claim 7 wherein the at least one of processor-executable instructions or data further cause the at least one processor to retrieve a target capacitance shared by a plurality of qubits including the qubit and determine a difference between the predicted capacitance and the target capacitance to determine the capacitance increment.

10. The computational system of claim 9 wherein the at least one of processor-executable instructions or data further cause the at least one processor to determine a respective capacitance increment for each qubit of the plurality of qubits and tune the effective capacitance of each qubit of the plurality of qubits based on the target capacitance.

11. The computational system of claim 7 wherein the at least one of processor-executable instructions or data further cause the at least one processor to apply the coupling strength to the coupler based on a square root of the capacitance increment.

12. The computational system of claim 7 wherein the at least one of processor-executable instructions or data further cause the at least one processor to:
receive a problem;
cause the quantum processor to execute the problem based on the tuning the effective capacitance of the qubit; and
provide an output state based on the execution of the problem.

13. The method according to claim 1 wherein determining a predicted capacitance for the qubit comprises retrieving an intrinsic capacitance of the qubit based on a capacitance of a capacitor of the qubit.

14. The method according to claim 1 wherein causing the quantum processor to apply the coupling strength to the coupler comprises causing the quantum processor to load a flux bias into a tuning interface of the coupler.

15. The method according to claim 1 wherein tuning the effective capacitance of the qubit by causing the quantum processor to apply a coupling strength to a coupler coupling the qubit to the capacitance loop comprises tuning the effective capacitance of the qubit by causing the quantum processor to apply a coupling strength to a coupler that is coupled electrically in parallel to both the qubit and the capacitance loop.

16. The computational system of claim 7 wherein the predicted capacitance for the qubit comprises an intrinsic capacitance of the qubit based on a capacitance of a capacitor of the qubit.

17. The computational system of claim 7 wherein causing the quantum processor to apply the coupling strength to the coupler comprises causing the quantum processor to load a flux bias into a tuning interface of the coupler.

18. The computational system of claim 7 wherein the coupler is coupled electrically in parallel to both the qubit and the capacitance loop.

* * * * *